US009694841B2

(12) United States Patent
Hansen et al.

(10) Patent No.: US 9,694,841 B2
(45) Date of Patent: Jul. 4, 2017

(54) STEERING COLUMN ARRANGEMENT FOR A MOTOR VEHICLE

(71) Applicant: Daimler AG, Stuttgart (DE)

(72) Inventors: Detlef Hansen, Schenefeld (DE); Torsten Harms, Hamburg (DE); Holger Kittler, Hamburg (DE); Jan Maak, Seevetal (DE); Paul Root, Hamburg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/027,659

(22) PCT Filed: Jul. 26, 2014

(86) PCT No.: PCT/EP2014/002041
§ 371 (c)(1),
(2) Date: Apr. 6, 2016

(87) PCT Pub. No.: WO2015/051862
PCT Pub. Date: Apr. 16, 2015

(65) Prior Publication Data
US 2016/0244085 A1    Aug. 25, 2016

(30) Foreign Application Priority Data

Oct. 7, 2013    (DE) .................. 10 2013 016 534

(51) Int. Cl.
*B62D 1/16*    (2006.01)
*B62D 1/184*    (2006.01)

(52) U.S. Cl.
CPC .................. *B62D 1/184* (2013.01)

(58) Field of Classification Search
CPC .................................................. B62D 1/184
(Continued)

(56) References Cited

U.S. PATENT DOCUMENTS 5,282,394 A * 2/1994 Dominique ............ B62D 1/184
403/24
6,039,350 A * 3/2000 Patzelt .................. B62D 1/184
280/775

(Continued)

FOREIGN PATENT DOCUMENTS

CN          104271429 A      1/2015
DE    10 2006 034 714 A1    1/2008
(Continued)

OTHER PUBLICATIONS

PCT/EP2014/002041, International Search Report (PCT/ISA/220 and PCT/ISA/210) dated Nov. 27, 2014, with partial English translation, enclosing Written Opinion of the International Searching Authority (PCT/ISA/237) (Ten (10) pages).

(Continued)

*Primary Examiner* — Toan To
(74) *Attorney, Agent, or Firm* — Crowell & Moring LLP

(57) ABSTRACT

A steering column arrangement for a motor vehicle, in particular a passenger motor vehicle, is disclosed. The steering column arrangement has a console and a steering column that is mounted between respective console arms by intercession of an intermediate section, in particular a casing pipe box. The steering column is set releasably on the console by a clamping device where the clamping device includes at least one wedge pair that is held on the console by a support element. The wedge pair has respective clamping wedges where the clamping wedges adjoin each other directly and the wedge pair is supported on its side facing away from the intermediate section, in particular the casing pipe box, by the support element.

9 Claims, 3 Drawing Sheets

(58) Field of Classification Search
USPC .......................... 74/492, 493; 280/775, 777
See application file for complete search history.

(56) References Cited

U.S. PATENT DOCUMENTS

| | | | |
|---|---|---|---|
| 6,092,957 | A | 7/2000 | Fevre et al. |
| 6,419,269 | B1* | 7/2002 | Manwaring ............ B62D 1/195 |
| | | | 280/775 |
| 6,860,669 | B2* | 3/2005 | Laisement ............ B62D 1/184 |
| | | | 280/775 |
| 8,984,983 | B2 | 3/2015 | Hansen et al. |
| 2005/0121895 | A1* | 6/2005 | Manwaring ............ B62D 1/184 |
| | | | 280/775 |
| 2014/0260762 | A1* | 9/2014 | Streng .................... B62D 1/195 |
| | | | 74/493 |
| 2014/0305251 | A1* | 10/2014 | Wilkes .................. B62D 1/184 |
| | | | 74/493 |
| 2015/0096404 | A1* | 4/2015 | Martinez ................ B62D 1/195 |
| | | | 74/492 |

FOREIGN PATENT DOCUMENTS

| | | |
|---|---|---|
| DE | 10 2010 051 880 A1 | 5/2011 |
| DE | 10 2012 008 836 A1 | 10/2013 |
| WO | WO 2005/100129 A1 | 10/2005 |

OTHER PUBLICATIONS

German-language Office Action issued in German counterpart application No. 10 2013 016 534.2 dated May 26, 2014 (Three (3) pages).

Chinese Office Action issued in Chinese counterpart application No. 201480055130.3 dated Jan. 5, 2017, with partial English translation (Nine (9) pages).

* cited by examiner

STEERING COLUMN ARRANGEMENT FOR A MOTOR VEHICLE

BACKGROUND AND SUMMARY OF THE INVENTION

The invention relates to a steering column arrangement for a motor vehicle.

Such a steering column arrangement can, for example, already be considered as known from DE 10 2010 051 880 A1. The steering column arrangement comprises a console and a steering column that is mounted between respective console arms by intercession of an intermediate section in the form of a casing pipe box, the steering column being set releasably on the console by means of a clamping device. This clamping device comprises at least one wedge pair, having respective clamping wedges, held on the console by means of a support element in the form of a clamping sheet. Here, the clamping force of the clamping device is generated by means of a tensioning device on the side facing away from the clamping device, the tensioning device being connected to the clamping device via a clamping bolt.

The known clamping device fulfils the requirements for ensuring a high level of rigidity for the steering column in the longitudinal direction and, at the same time, a high level of clamping force transmission. Respective friction films are this arranged between the respective clamping wedges or between the clamping wedge close to the console and the console itself for the purpose of high clamping force transmission. Respective clamping springs are moreover provided in order to ensure a defined positioning of the clamping wedges. Here, the clamping sheet is designed to be flexible in the transverse direction of the steering column arrangement and rigid in the longitudinal direction of the steering column. In the event of an axial displacement of the casing pipe of the steering column caused by an accident, an increased retention force thus arises, such that excessive displacement of the steering column is able to be prevented. In this context, it is important for the clamping sheet to be designed to be correspondingly rigid. Thus the clamping section is unable to move in the longitudinal direction of the steering column arrangement, but rather it is configured to be rigid. However, due to the flexible design in the transverse direction, a favorable transfer of the clamping forces with the clamping device is enabled. Overall, therefore, the contrast between a simultaneously high level of rigidity and resonant frequency of the steering column and, on the other hand, good clamping force transmission, is ensured in a simple manner.

However, the present clamping device is configured relatively elaborately and is accordingly unfavorable to install.

The object of the present invention is therefore to create a steering column arrangement of the type cited at the beginning which is constructed more simply and is easier to install.

In order to create a steering column arrangement of the type cited at the beginning which is constructed more simply and is able to be installed more easily, provision is made according to the invention for the clamping wedges to directly adjoin each other and for the wedge pair to be supported on its side facing away from the intermediate section, in particular the casing pipe box, by means of the support element. In contrast to the prior art, the clamping three between the two clamping wedges does therefore not have to be transmitted via the support element, but rather the clamping wedges adjoin each other directly. As a consequence, what is to be understood by this direct adjoining is therefore that, according to the invention, the support element is no longer arranged between the two clamping wedges, as had hitherto been known in the prior art according to DE 10 2010 051 880 A1. However, it is nevertheless conceivable, should a specific increase in the clamping force be required, to provide friction-enhancing agents such as friction films or suchlike between the respective clamping wedges.

Along with the direct attachment of the two clamping wedges to each other, the support element according to the invention is arranged on the side facing away from the allocated console arm, wherein it supports the wedge pair accordingly. The support element can hereby be configured considerably more simply than is the case in the known prior art, which enables a simple construction of the entire steering column arrangement or the clamping device.

In one advantageous embodiment of the invention, at least one spring element is provided which is supported with one end on a clamping section and with the other end on the other clamping wedge, and by means of which the wedge pair is fixed in a recess of the allocated console arm. An extremely simple arrangement therefore arises from the combination of both wedge elements with the spring element, the arrangement being able to be fastened in a simple manner in the corresponding receiver of the console.

It has furthermore proved to be advantageous if a friction-enhancing agent, in particular a friction film, is provided between the clamping wedge close to the console and the allocated console arm. A particularly high level of clamping force between the wedge pair and the console can hereby be achieved.

It is furthermore advantageous if both clamping wedges, the friction film and the spring element are combined to term a pre-assembled constructional unit. The installation of the steering column arrangement can thereby be further simplified.

This constructional unit may be inserted in a simple manner into the receiver of the console provided for this purpose, if both clamping sections are pre-tensioned in the longitudinal direction of the vehicle by means of the spring element.

A further advantageous embodiment provides that the support element has an at least substantially even extension. A considerably simpler design compared to the above-described prior art hereby arises.

Here, it has been shown to be advantageous in a broader context if the support element is designed as a support sheet. Such a support sheet is able to be manufactured simply and cost-effectively and can be installed easily on the console.

Finally, it has been shown to be advantageous if both clamping wedges are designed to be identical in shape or as equivalent parts. The manufacturing process of the clamping sections can hereby be simplified and designed more cost-effectively.

Further advantages, features and details of the invention arise from the following description of a preferred exemplary embodiment as well as with the aid of the drawings.

DETAILED DESCRIPTION OF THE DRAWINGS

Figure 1:
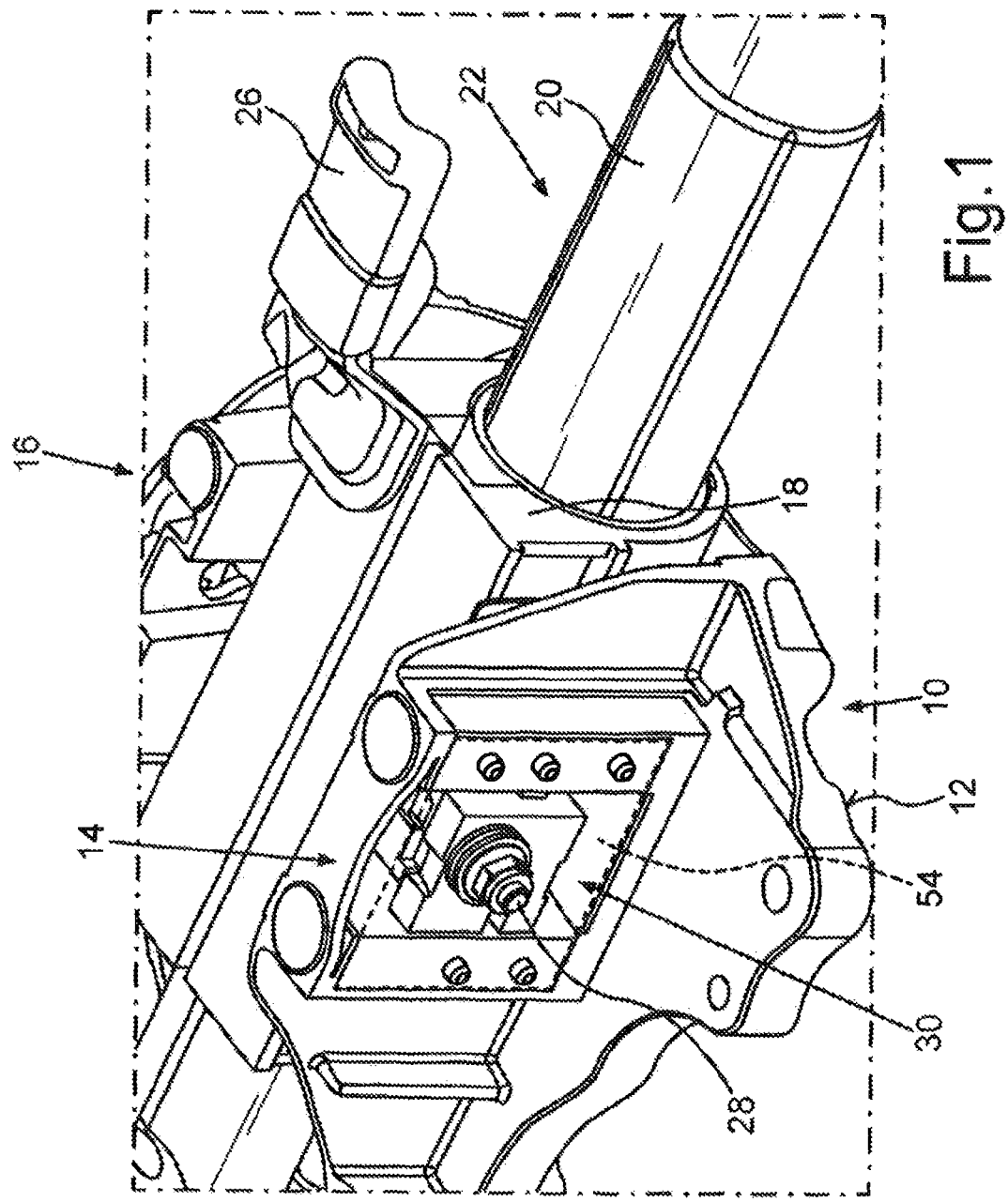
FIG. 1 is a sectional perspective view from diagonally down and to the front of a steering column arrangement for a motor vehicle, having a console and having a steering column mounted between respective console arms by intercession of a easing pipe box, the steering column being set releasably on the console by means of a clamping device, the clamping device comprising at least one wedge pair that is held on the console by means of a support element, having respective clamping wedges, wherein the clamping wedges adjoin each other directly and the wedge pair is supported on the side facing away from the allocated console arm by means of the support element in the form of the support sheet.

A steering column arrangement for a passenger motor vehicle is depicted in FIG. 1 in a sectional, perspective view from diagonally down and to the front. Here, a steering console 10 can firstly be recognized, which is able to be set with an upper side 12 on the shell side on the motor vehicle. The steering console 10 comprises two console arms 14, 16 that protrude perpendicularly downwards, between which an intermediate section extends in the form of a casing pipe box 18. This casing pipe box 18 receives a casing pipe 20 of a steering column 22 with a cylindrical receiver, the steering column moreover comprising a steering spindle received within the casing pipe 20. However, this cannot be seen in the figures. The casing pipe 20 or the steering column 22 is mounted as a whole on the console 10 by intercession of the casing pipe box 18, and more precisely with a clamping device 30. In the present instance, this clamping device 30 is actuated manually-mechanically by means of a handle 26 in a manner that is to be described in greater detail below, such that, after opening the clamping device 30, the steering column 22 can be varied in its height adjustment and/or length adjustment—and in its adjusted position—and can be fixed again by setting the clamping device 30.

Here, by actuating the handle 26, respective tension discs, for example, are rotated around an axis formed by as clamping bolt 28, which leads to a clamping force acting in the axial direction of the clamping bolt 28. In other words, an axial force can be exerted on the clamping device 30 by actuating the handle 26 and by intercession of the clamping bolt 28, such that the casing pipe 20 is fixed in a clamped manner between the two console arms 14, 16 of the steering console 10 by means of the casing pipe box 18. The structure of the tension discs of the tensioning device, which cannot be seen in the present instance, thus corresponds to the one according to DE 10 2010 051 880 A1, for example.

Figure 2:
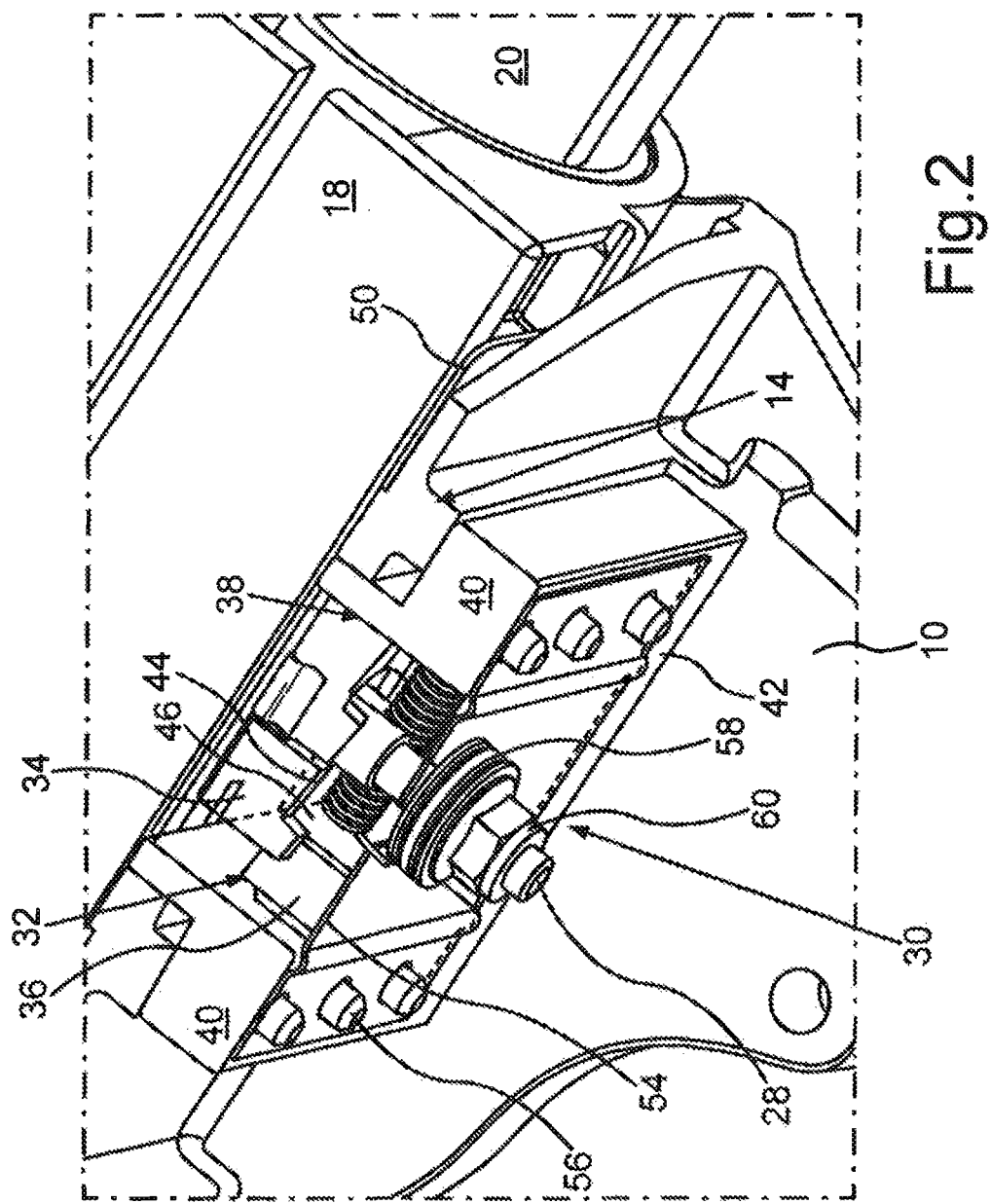
FIG. 2 is a sectional and enlarged perspective view from diagonally below the console arm of the steering column on which the clamping device is supported with the clamping wedges by intercession of the support sheet.
Figure 3:
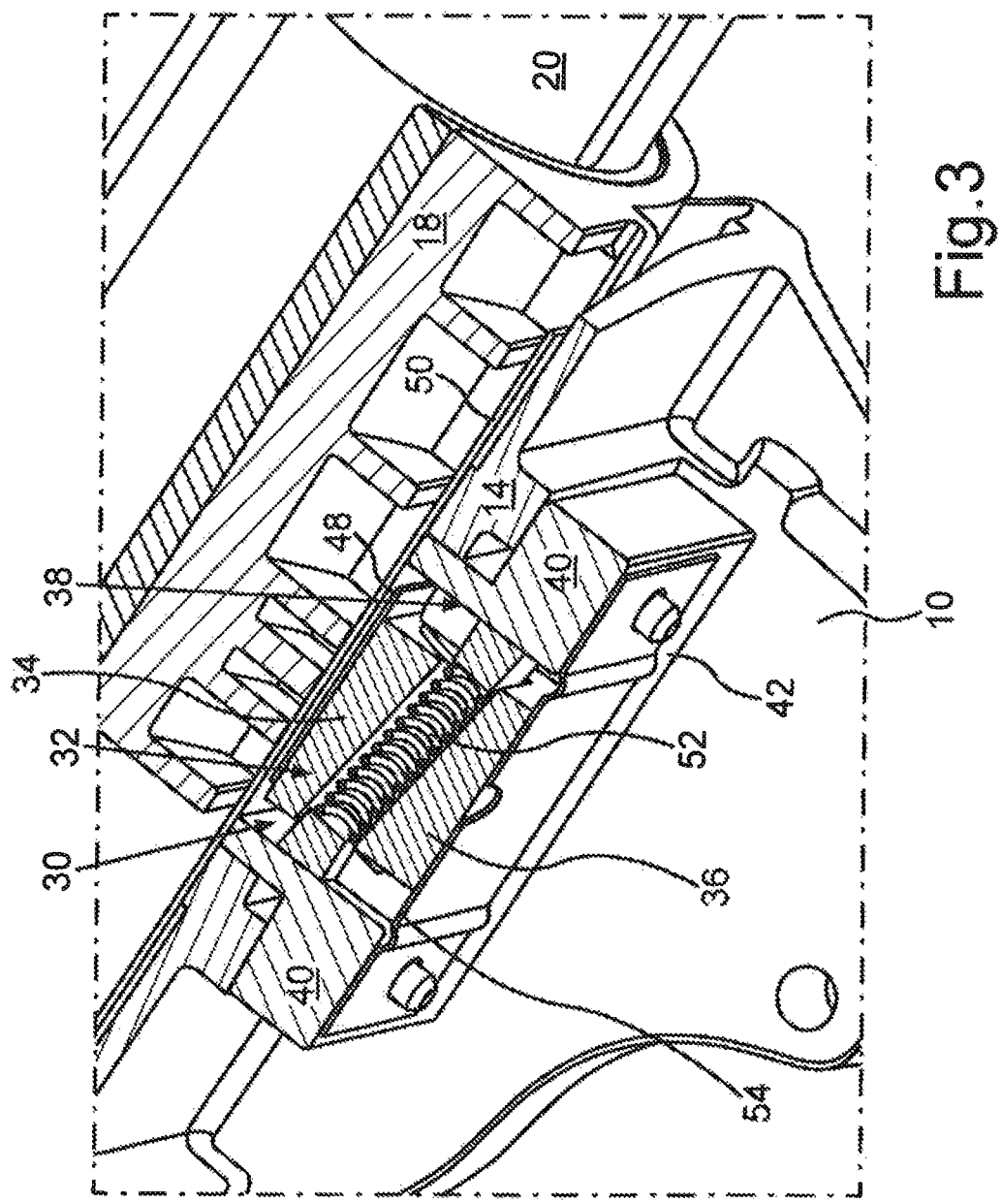
FIG. 3 is a further, sectional, enlarged perspective view from diagonally below the clamping device arranged on the corresponding console arm of the steering console, the clamping device being shown in a sectional depiction, whereby the wedge pair with the clamping wedges and a corresponding spring element are able to be detected.

In synopsis with FIGS. 2 and 3, which show the steering column arrangement according to FIG. 1 in the region of one of the console arms 14 in a respective, sectionally enlarged perspective view, the functionality and structure of the clamping device 30 is now to be explained in particular. Here, FIG. 2 shows the clamping device 30 in the region of the console arm 14 in the assembled state, and FIG. 3 shows the clamping device 30 in a sectional view along a sectional plane running transverse to the console arm 14.

As can now be seen from FIGS. 2 and 3, the clamping device 30 comprises a wedge pair 32 with the clamping wedges 34 and 36, which—as can be seen from FIG. 2—is penetrated by the clamping bolt 28. The wedge pair 32 is received within a receiver 38 of the corresponding console arm 14, the receiver being designed to be substantially prismatic or box-like and being delineated to the front and rear in the longitudinal direction of the vehicle (x direction) by respective cleats 40. The cleats 40 are formed in the present instance as separate parts which are fixed on the console 10. It would of course also be conceivable to design the cleats 40 integrally with the console 10. Here, it can furthermore be recognized that both cleats 40 are connected to each other on the upper side by a cleat 42. There thus arises a substantially U-shaped basic contour of the receiver 38.

As can now in particular be seen in the sectional view according to FIG. 3, both clamping wedges 34, 36 of the wedge pair 32 are designed with an identical shape and are arranged directly adjoining each other over respective clamping faces 44, 46. The clamping wedge 34 facing towards the casing pipe box 18 is thus supported by intercession of a friction-enhancing agent, presently in the form of a friction film 48, on the allocated wall region 50 of the casing pipe box 18. In the present instance, this wall region 50 is formed by a separate sheet element of the casing pipe box 18.

Moreover, it can be seen from FIG. 3 that both clamping wedges 34, 36 are mutually supported by means of a spring element 52 in the form of a helical spring. For this, the spring element 52 is supported with one end on a damping wedge 34 and with the other end on the other clamping wedge 36. Both clamping wedges 34, 36 are therefore braced by the spring element 52 within the receiver 38 of the console arm 14 in the longitudinal direction of the vehicle (x direction) or in the extension direction of the steering column 22, or are fixed to the console 10.

The fixing or support of the clamping wedges 34, 36 takes place in the transverse direction of the vehicle (y direction) by means of a support element 54 which is presently designed as a support sheet. The wedge pair 32 having the clamping wedges 34, 36 is therefore supported accordingly by this support sheet 54 on the side facing away from the corresponding console arm 14 or the casing pipe 20 and the casing pipe box 18, and is held within the receiver 38. It can thus be seen in particular from FIG. 2 that the support sheet 54 has an at least substantially planar extension and, as a consequence, is able to be manufactured extremely simply. In the present instance, it is fixed to the respective cleats 40 via a plurality of locking pins 56. It can moreover be seen from FIG. 2 that the support sheet 54 is penetrated by the clamping bolt 28. A disc 58 and a nut 60 are applied to the clamping bolt 28 on the outer side of the support sheet 54.

If an axial force is now applied to the clamping bolt 28 by means of the clamping device just described, by actuating the handle 28, and the clamping bolt is moved accordingly in the axial direction, the clamping device 30 is consequently loaded—or not—with a clamping force by intercession of the nut 60 and the disc 58. As a consequence, it is possible to move the casing pipe 20 or the steering column 22 relative to the console 10 by releasing the clamping device 30, whereas, if the clamping device 30 is fixed, a setting of the steering column 22 or the casing pipe 20 relative to the console 10 is provided.

The present clamping device 30 is particularly distinguished by the fact that both clamping sections 34, 36 adjoin each other directly, so by the fact that the support sheet 54—by contrast with the prior art according to DE 10 2010 051 880 A1—is not arranged between both clamping wedges 34, 36, but rather on the outer side of the wedge pair 32. The clamping device 30 is furthermore distinguished by the fact that, in the present instance, only one spring element 52 preferably has to be provided in order to brace both clamping wedges 34, 36 within the receiver 38 in the longitudinal direction of the vehicle (x direction). Here, the advantage additionally arises that both clamping wedges 34, 36, the spring element 52 and potentially also the friction film 48 between the clamping wedge 34 close to the console and the wall region 50 of the casing pipe box 18 are able to be combined to form a pre-assembled constructional unit. There hereby arises a considerably simpler installation of the clamping device 30 on the e console 10.

In any case, the clamping device 30 guarantees a rigid fixing of the casing pipe 20 or the steering column 22 in the longitudinal direction of the vehicle, since the clamping device 30 is fixed with the utmost stability within the receiver 38 in the longitudinal direction of the vehicle (x direction). On the other hand, a highly favorable clamping of the steering column 22 or the casing pipe 20 arises, since the support sheet 54 is configured to be correspondingly more flexible in the transverse direction (y direction).

The invention claimed is:

1. A steering column arrangement for a motor vehicle, comprising:
    a console with console arms and a casing pipe box;
    a steering column, wherein the steering column is mounted between the console arms and is received within the casing pipe box; and
    a clamping device, wherein the steering column is set releasably on the console by the clamping device and wherein the clamping device includes a wedge pair that is held on the console by a support element;
    wherein the wedge pair has clamping wedges, wherein the clamping wedges adjoin each other directly, and wherein the wedge pair is supported on a side facing away from the casing pipe box by the support element.

2. The steering column arrangement according to claim 1, further comprising a spring element, wherein the spring element is supported with a first end on a first one of the clamping wedges and with a second end on a second one of the clamping wedges and wherein the wedge pair is fixed in a receiver of one of the console arms by the spring element.

3. The steering column arrangement according to claim 2, further comprising a friction-enhancing agent, wherein the friction-enhancing agent is disposed between the wedge pair and the casing pipe box.

4. The steering column arrangement according to claim 3, wherein the friction-enhancing agent is a friction film.

5. The steering column arrangement according to claim 3, wherein the wedge pair, the friction enhancing agent, and the spring element are combined to form a pre-assembled constructional unit.

6. The steering column arrangement according to claim 2, wherein the clamping wedges are pre-tensioned in a longitudinal direction of the motor vehicle by the spring element.

7. The steering column arrangement according to claim 1, wherein the support element has an at least substantially planar extension.

8. The steering column arrangement according to claim 7, wherein the support element is a support sheet.

9. The steering column arrangement according to claim 1, wherein each of the clamping wedges are identically shaped.

* * * * *